United States Patent [19]

Cordill

[11] Patent Number: 4,670,872

[45] Date of Patent: Jun. 2, 1987

[54] COMMUNICATION LINK CONTENTION RESOLUTION SYSTEM

[75] Inventor: Leroy D. Cordill, Bartlesville, Okla.

[73] Assignee: Phillips Petroleum Company, Bartlesville, Okla.

[21] Appl. No.: 751,103

[22] Filed: Jul. 2, 1985

[51] Int. Cl.[4] .......................... H04J 3/02; H04J 3/06; H04L 7/00

[52] U.S. Cl. ..................................... 370/85; 370/100; 340/825.51; 375/107

[58] Field of Search .............................. 370/9985, 100; 340/825.51; 375/107

[56] References Cited

U.S. PATENT DOCUMENTS

| | | | |
|---|---|---|---|
| 4,149,144 | 4/1979 | Diefenderfer | 370/85 |
| 4,156,112 | 5/1979 | Moreland | 370/85 |
| 4,241,444 | 12/1980 | Kister | 370/85 |
| 4,313,196 | 7/1982 | Oblonsky | 370/85 |
| 4,359,731 | 11/1982 | Beauford et al. | 340/825.51 |
| 4,458,314 | 7/1984 | Grimes | 364/200 |

Primary Examiner—Douglas W. Olms
Assistant Examiner—Frank M. Scutch, III
Attorney, Agent, or Firm—George E. Bogatie

[57] ABSTRACT

Each of a plurality of programmable master devices having access to a data communication link is assigned a unique address based on the priority of that master device. The unique address of each master device is loaded into an associated counter when a link contention signal is impressed on the link by one of the master devices, and all counters begin counting down at the same time and at the same rate when the contention signal is terminated, whereby the counter with the lowest number address times out first and its associated master device can gain access to the data link. The unique address of each master device thus provides a way for higher priority master devices to lock out lower priority master devices so as to prevent simultaneous transmission on the data link and also to prevent loss of high priority data.

9 Claims, 2 Drawing Figures

COMMUNICATION LINK CONTENTION RESOLUTION SYSTEM

This invention relates to serial data communication. In one aspect this invention relates to method and apparatus for synchronizing access to a data communication link between multiple master devices. In another aspect this invention relates to method and apparatus for insuring that high priority data is not lost.

BACKGROUND OF THE INVENTION

As used herein the term "master device" refers to a programmable device which has the capability both to transmit and receive data and has the capability to initiate a data transaction. It is well known to connect a plurality of such devices together on a single data bus in such a manner that the devices can transmit data to each other or receive data from each other. Passive slave devices may also be connected to the data bus but in general these devices cannot initiate a data transaction.

Various problems may arise in systems where a plurality of master devices are linked together by a single data link. The master devices may try to communicate simultaneously on the data link and thus interfere with each other. Also, in a system where the data provided from one master device has priority over data provided from other master devices, the priority data may be lost because lower priority data is being transmitted on the link at the same time that the higher priority data is ready for transmission.

A data link contention system which has provided an effective solution to the aforementioned problems is disclosed in U.S. Pat. No. 4,359,731, issued Nov. 16, 1982 to Beauford et al. However, the system disclosed in that patent requires both a data link and an access channel. It would be desirable to be able to operate without the access channel.

It is thus an object of this invention to provide method and apparatus for synchronizing access to a data communication link between multiple master devices without requiring an access channel. It is another object of this invention to provide method and apparatus for insuring that high priority data is not lost.

SUMMARY OF THE INVENTION

In accordance with the present invention method and apparatus is provided whereby each master device having access to the data link is assigned a unique address based on the priority of that master device. The unique address of each master device provides a means by which the highest priority master devices can lock out the lower priority master devices so as to prevent simultaneous transmission on the data communications link and also prevent loss of high priority data. Access to the data link is accomplished using the data link and not an access channel.

This generally is accomplished by utilizing a link contention signal which can coexist on the data link with the data signal. The link contention signal is indicative of activity on the data link. Presence or absence of the signal is detacted and corresponds respectively to the active or inactive state of a detection circuit. The active state of the detection circuit indicates on going data activity on the data link; the inactive state of the detection circuit indicates an idle period on the data link. The active state of the link contention detect circuit presets timers associated with each one of the master devices to the unique priority address of the associated master device and holds the counters preset for as long as the contention detect circuit is active. After such presetting, termination of the link contention signal, which is indicated by the detection circuit making a transition from an active state to an inactive state, causes each of the timers to begin counting down at the same frequency. As each timer times out, the associated master device has a particular time period to gain control of the data communication link and complete a data transaction.

BRIEF DESCRIPTION OF THE DRAWINGS

Other objects and advantages of the invention will be apparent from the foregoing brief description of the invention and the claims as well as the detailed description of the drawings in which:

DESCRIPTION OF THE PREFERRED EMBODIMENT

The invention is described in terms of specific electronic components and specific computer systems. However, the invention is applicable to different electronic circuit configurations which carry out the purpose of the present invention and is also applicable to different circuit components and different computer systems which are supplied by a plurality of vendors.

Figure 1:
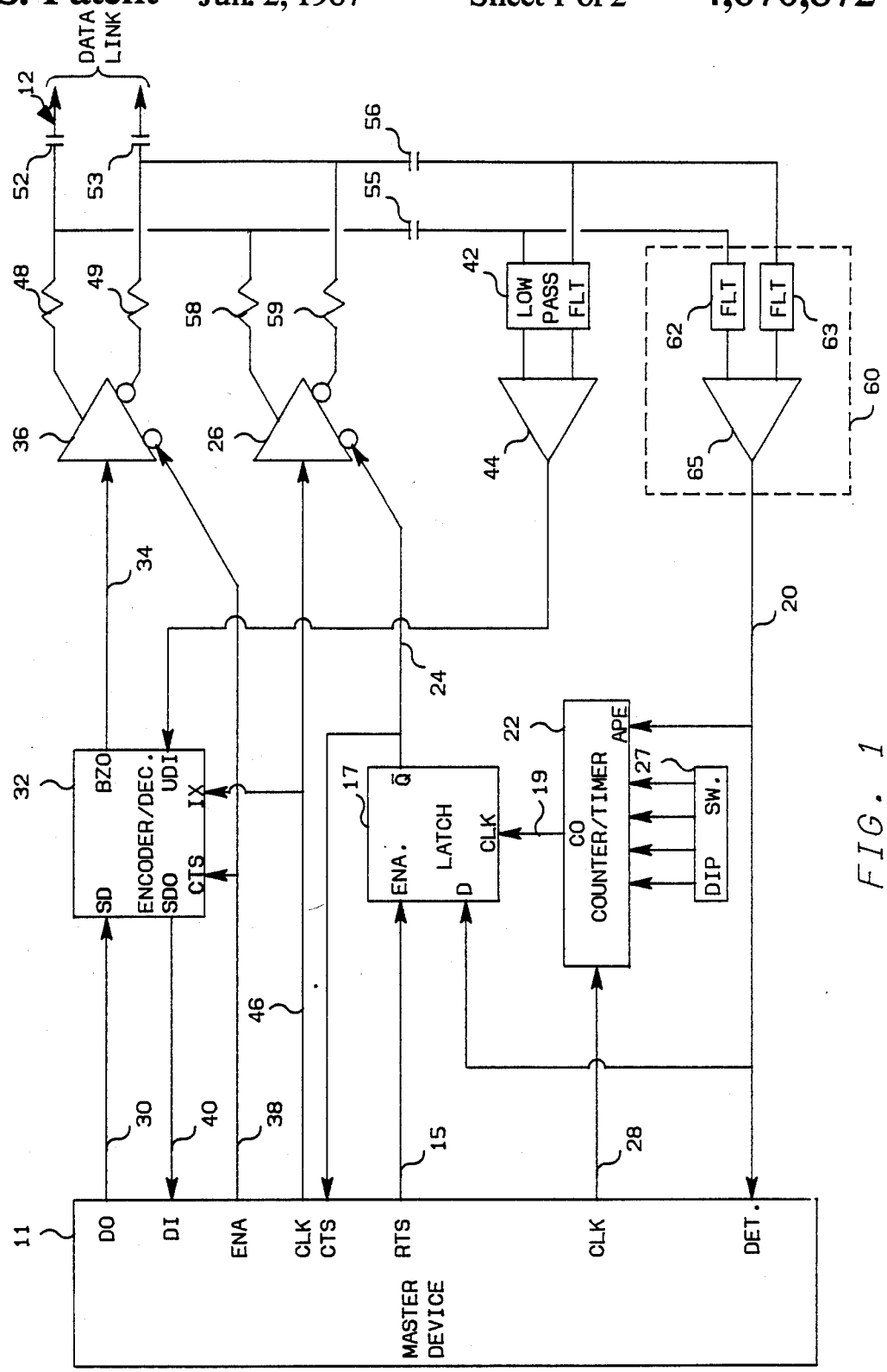
FIG. 1 is a simplified diagrammatic illustration of the contention resolution system.

Referring now to the drawings and in particular to FIG. 1, there is illustrated a master device 11. For the sake of convenience only one master device is illustrated, but it should be recognized that there will be at least two master devices in the system and possibly a large number of master devices. As has been previously stated, the master device must have the capability to initiate a data transaction on the data link 12 which is a wire pair. Almost any progrmmable system may be utilized as the master device 11 so long as the system has the capability to generate the request-to-send (RTS) signal and receive a clear-to-send (CTS) signal such as described in EIA Standard RS-232-C, published August 1969 by the Engineering Department of the Electronic Industries Association. Again most all programmable systems which have the ability to transmit and receive data have the capability of generating the request-to-send signal which is indicative of a desire to initiate a data transaction and also have the capability to receive a clear-to-send signal which indicates that a particular data channel may be accessed. A system such as the 6800 Microprocessor System together with the 6820 Peripheral Interface Adapter and the 6850 Asynchronous Communications Interface Adapter all of which are manufactured by Motorola semiconductor are a particular example of a system which may be utilized as the master device 11. The use of the 6800 Microcomputer family is fully described in M6800 Microcomputer System Design Data, published by Motorola Semiconductor Products, Inc. in 1976.

The data link 12 illustrated in FIG. 1 is interfaced to the master device 11 via circuitry which provides for resolving contention for the data link among a plurality of master devices that can be connected to the data link. The request-to-send (RTS) signal 15, originating in the master device 11 and indicating, when active, that data is available for transmission, is provided to the clear input of the line contention latching circuit 17 and acts as an enable signal for latching circuit 17. Other inputs to the line contention latching circuit 17 are the time out signal 19 connected to the clock input and the contention detect signal 20 connected to the data input. Both of these signals are described more fully hereinafter.

In response to signals 15, 19 and 20 the line contention latching circuit 17 generates a clear-to-send (CTS) signal 24 which is provided to the master device 11 and to the enable input of line driver 26. The use of the clear-to-send signal 24 will also be discussed more fully hereinafter.

A clock signal 46 is provided from the master device 11 to the clock input of Manchester encoder-decoder (MED) 32. Clock signal 46 is also utilized as the link contention signal and is provided as the input signal to line driver 26. When enabled by CTS signal 24, line driver 26 differentially drives data link 12 through resistors 58–59 and coupling capacitors 52–53.

A clock signal 28 which is a submultiple of clock signal 46 is provided from the master device 11 to the clock input of the presettable binary counter 22. The frequency of clock signal 28 is selected to provide a desired unique time period for a master device to gain control of the data link. An essentially identical signal is provided to all of the counters associated with each of the master devices in the system. All of these clock signals will have the same frequency. Thus each of the counters associated with the master devices will count at the same frequency. Also the preset inputs of the presettable binary counter 22 are tied to a dual inline package (DIP) switch 27.

A preset enable signal for the presettable binary counter 22 is provided by the contention detect signal 20. The contention detect signal 20 is driven to an active state when the link contention signal is present on data link 12, and goes to an inactive state when the link contention signal is not present on data link 12. A time out signal 19 is generated from the carry output of the counter 22 and provided to the clock input of the latching circuit 17. The time out signal 19 provides an indication to the latching circuit 17 that the counter 22 has completed a specified count down from the number to which the counter was preset.

Essentially, the counter 22 is preset to a number corresponding to the unique address of the master device 11 when the link contention detect signal 20 is active. The counter 22 begins to count down from the preset number at the frequency of the clock signal 28 when line contention detect signal 20 makes a transition from active to inactive. When the counter 22 reaches a specified count (usually zero) the time out signal 19 provides a pulse to the clock input of the link contention latching circuit 17 which causes the output of the latching circuit, CTS signal 24, to become active if request-to-send signal 15 is active when time-out signal 19 clocks latching circuit 17.

Serial data is provided from the master device 11 to the serial data (SD) input of the Manchester encoder-decoder (MED) 32 via the data output signal 30. Also provided from the master device 11 to MED 32 is the clock signal 46. The frequency of clock signal 46 is selected to provide a desired data rate from MED 32. The MED 32 receives the serial data at its SD input, converts the data into Manchester code, and provides a corresponding coded data signal 34 to the data line driver 36. The data line driver 36 and the MED 32 are enabled by the enable signal 38 when it is desired to transmit data on the data link 12, and line driver 36 differentially drives data link 12 through resistors 48–49 and coupling capacitors 52–53.

Data received from data link 12 is provided to the master device 11 through the data input signal line 40 via an interface which is made up of the combination of capacitors 55–56, low pass filter 42, line receiver 44, and MED 32.

The link contention detect signal 20 is provided to the master device 11 through an interface which is made up of the combination of capacitors 55–56 and detection circuit 60. Detection circuit 60 includes piezoelectric ceramic filters 62–63 and line receiver 65.

Figure 2:
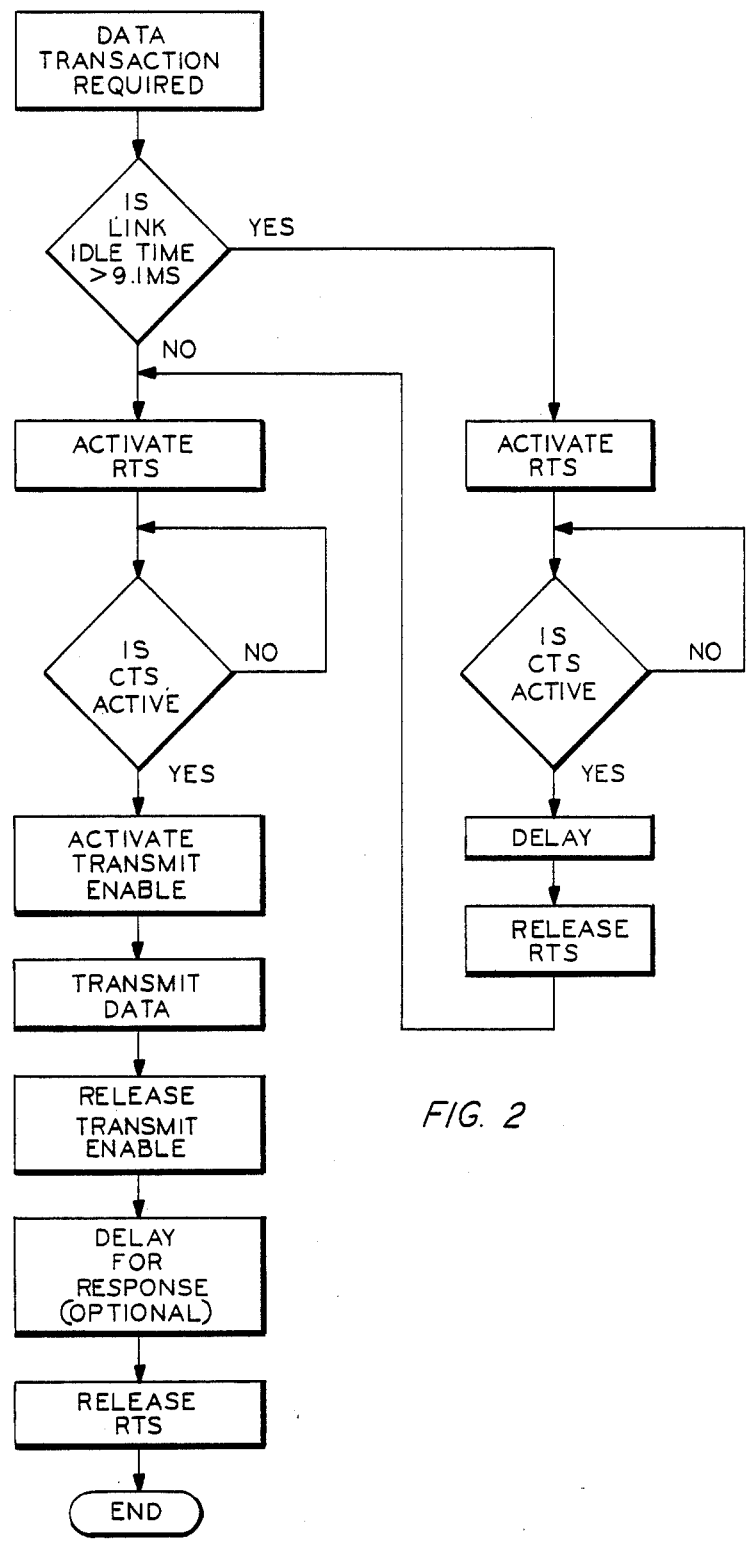
FIG. 2 is a logic flow diagram for the contention resolution system.

Operation of the apparatus illustrated in FIG. 1 will be described in conjunction with the logic flow diagram illustrated in FIG. 2. The logic illustrated in FIG. 2 is implemented by means of a software program. The various signals illustrated in FIG. 1 are referred to as being in the active or inactive state. These states are generally certain voltage levels with the most commonly used being +5 volts for the active state and approximately 0 volts for the inactive state. Obviously, other voltages and relations could be utilized if desired.

For the logic illustrated in FIG. 2, the clear-to-send signal 24 is active for a programmable master device 11 if two sequential conditions are satisfied. First the programmable master device 11 must activate its request-to-send signal 15 and secondly the time out signal 19 must become active to clock the data present (signal 20) at the D input of latching circuit 17 to the output of latching circuit 17. This has the effect of latching clear-to-send signal 24 in the active state such that it remains active until the request-to-send signal 15 is released by master device 11.

For the sake of illustration it is first assumed that master device 11 requires a data transaction and initiates the logic illustrated in FIG. 2. The master device 11 first determines if there has been activity on data link 12 during an immediate predefined time period. The immediate period of time of interest is the time required for the counter associated with the lowest priority master device to time out. Assuming a system having thirty-two master devices with each master device having a unique time period of 281 $\mu$sec in which to gain control of the data link, the immediate period of interest would be about 9 msec. For illustrative purposes a predefined period of 9.1 msec is referred to hereinafter. If link contention detect signal 20 is inactive and has been inactive for a period of time greater than 9.1 msec, the logic branches to generate a sync pulse as will be described more fully hereinafter. Assuming that the data link 12 is active or has been inactive for less than 9.1 msec, the master device 11 activates request-to-send signal 15. The logic illustrated in FIG. 2 next advances to a wait loop for clear-to-send signal 24 to become active. As previously described the counters 22 begin to count down from their preset numbers when the link contention signal 20 makes a transition from active to inactive. If the clear-to-send signal becomes active, this is an indication of absence of data transmission activity on data link 12 and that the master device 11 is the highest priority master device that has activated its request-to-send signal. After the clear-to-send signal 24 becomes active, master device 11 activates enable signal 38 to enable MED 32 and line driver 36. Master device 11 then executes the data transaction on data link 12, by transmitting the required data, releasing enable signal 38, delaying for a response to the transmitted data if required, and finally releasing request to send signal 15.

If data link 12 has been inactive for a period of time greater than 9.1 msec when a data transaction is required, this is an indication that the counters 22 have not been preset to their unique address based on the priority of their associated master devices for this period of time. In this event all of the counters 22 have exceeded their counting capacity. Also the associated clock signals 28 could have drifted sufficiently to interfere with the unique time periods allowed for a master device to gain control of the data link 12. As previously mentioned the logic illustrated in FIG. 2 branches to generate a sync pulse prior to executing a data transaction. For the logic in the branch path illustrated in FIG. 2, the master device 11 activates request to-send signal 15, and then advances to a wait loop until clear-to-send signal 24 becomes active. Activation of clear-to-send signal 24 enables line driver 26 thus impressing the line contention signal on data link 12. This has the effect of driving link contention signal 20 to an active state thereby presetting all of the counters 22 that are interfaced to data link 12 and holding all of the counters 22 in the preset condition as long as link contention signal 20 is active. After clear-to-send becomes active, the branch logic delays for a short period of time, usually about 2 msec, to insure that a sufficient burst of the line contention signal is impressed on data link 12 so that all counters 22 are preset. The request-to-send signal is then released and the logic returns to the primary path to execute a data transaction.

If the clear-to-send signal is active, the master device 11 executes one data transaction and releases the request-to-send signal 15. If the master device 11 needs further access to the data link 12 then the logic sequence illustrated in FIG. 2 is repeated. In this manner, access to the data channel 12 is synchronized and the master devices having the highest priority can always lock out master devices having lower priority so as to insure that high priority data is not lost.

The length of the data transaction will generally be determined by the particular system to which the present invention is applied. Thus, the length of the data transaction can vary from the time required to transmit one bit of information to the time required to transmit a large number of bits of information. However, there will generally be a maximum number of bits of information that can constitute a data transaction for a particular system. A large number of master devices can be interfaced to the data link 12. The system is limited only by the capacity of the counters or timers used and the consideration that low priority data transaction may never be completed if there are a large number of higher priority devices on data link. The system does require that each master device must be assigned a unique priority address and thus the capacity of the counters or timers which may be utilized may limit the system.

The invention has been described in terms of a preferred embodiment as is illustrated in FIGS. 1 and 2. The invention is not limited to the schematic illustrated in FIG. 1 and further is not limited to the precise logic illustrated in FIG. 2. It is well known that there are many circuit configurations which can be utilized to perform specified functions. This is especially true with regard to many elements in the circuits which are supplied by a plurality of manufacturers.

Specific electrical components or specifications which can be utilized in the circuit illustrated in FIG. 1 are as follows:

| | |
|---|---|
| Master Device 11 | MC6800 Microprocessor, |
| | MC6820 Peripheral Interface |
| | Adapter |
| | MC6850 Asynchronous Interface |
| | Adapter |
| | (Motorola Semiconductor) |
| Counter 22 | CD40103(RCA) |
| DIP Switch 27 | 76SB07 (Grayhill Inc.) |
| Line Drivers 26 and 36 | AM26LS30 (Advanced Micro |
| | Devices |
| Line Receivers 44 and 65 | LM319 (National Semiconductor |
| Resistors 58 and 59 | 150 ohms |
| Resistors 48 and 49 | 120 ohm |
| Capacitors 52 and 53 | 2 microfarad |
| Capacitors 55 and 56 | .022 microfarad |
| Manchester Encoder-decoder 32 | HD-6409 (Harris Semiconductor) |
| Latching Circuit 17 | CD4013 (RCA) |
| Low Pass Filter 42 | Cut off frequency 20 KHz |
| Filters 62 and 63 | SFU 455A (MuRata), 455 Khz, |
| | Center frequency |
| Clock signal 46 | 455 KHz |
| Clock signal 28 | 28.44 KHz |

While the invention has been described in terms of the presently preferred embodiment, reasonable variations and modifications are possible by those skilled in the art within the scope of the described invention and the appended claims.

That which is claimed is:

1. Apparatus for synchronizing access to a serial data communication line between a plurality of programmable master devices which each have the capability of initiating a data transaction on said data communication link, said apparatus comprising:

means for interfacing each one of said programmable master devices to said data communication link in such a manner that each one of said programmable master devices can impress a link contention signal on said serial data communication link when it is desired to initiate a data transaction and can detect the presence or absence of a link contention signal on said data communication link;

means for establishing a detection signal which is responsive to said link contention signal, wherein said detection signal is in a first state if said link contention signal is present on said serial data communication link and wherein the said detection signal is in a second state if said link contention signal is absent from said serial data communication link;

a plurality of timer means, each one of said plurality of timer means being associated with a respective one of said plurality of programmable master devices;

means for providing said detection signal to said programmable master device and to said timer means;

means for setting each one of said plurality of timer means to a different time when said detection signal makes a transition from said second state to said first state, wherein the setting is held for as long as said detection signal remains in said first state;

means for providing a first clock signal to each one of said plurality of timer means, all of said first clock signals having the same frequency, all of said timer means counting at the same rate, all of said timer means starting their count when said detection signal makes a transition from said first state to said second state; and means for informing each one of said plurality of programmable master devices when said serial data communication link is available for its use when its associated timer means has timed out, wherein the different times at which said plurality of timer means were set provides a unique time period for each one of said programmable master devices to gain control of said data communication link to execute a data transaction.

2. Apparatus in accordance with claim 1 wherein said data communication link is a wire pair.

3. Apparatus in accordance with claim 1 wherein means for informing each one of said plurality of programmable master devices when said serial data communication link is available for its use when its associated timer has timed out comprises means for providing a clear-to-send signal to the first programmable master device which desires to initiate a data transaction on said serial data communication link and whose associated timer has timed out, said clear-to-send signal making a transition from an inactive state to an active state only when said detection signal is in its second state, said clear-to-send signal remaining in its active state until released by said first programmable master device.

4. Apparatus in accordance with claim 3 further comprising the following apparatus associated with each one of said plurality of programmable master devices:
a latching circuit;
means for providing a request-to-send signal from a programmable master device as an enable input to said latching circuit when the programmable master device has data ready for transmission;
means for providing a time out signal from the associated timer means as a clock signal to said latching circuit when the associated timer means has timed out;
means for providing the associated detection signal as a data input to said latching circuit;
a Manchester encoder-decoder;
a first line driver for driving said serial data communication link;
means for providing a first serial data signal from the programmable master device to said Manchester encoder-decoder when said serial data communication link is available for use by the programmable master device;
means for providing a second serial data signal from said Manchester encoder-decoder to said first line driver;
means for providing a second clock signal from the programmable master device to said Manchester encoder-decoder to transmit serial data from said Manchester encoder-decoder to said first line driver;
means for providing an enable signal from the programmable master device to said Manchester encoder-decoder and said first line driver when said serial data communication link is available for use by the programmable master device;
a second line driver for driving said serial data communication link;
means for providing said second clock signal from the programmable master device to said second line driver, wherein said second clock signal is said line contention signal; and
means for providing an enable signal from said latching circuit to said second line driver when said serial data communication link is available for use by the programmable master device.

5. Apparatus in accordance with claim 4 wherein said timer means is a presettable binary counter.

6. Apparatus in accordance with claim 5 wherein said means for setting each one of said plurality of timer means in a different time comprises a DIP switch interfaced to an input of said presettable binary counter means, wherein the setting of said DIP switch is loaded into said presettable binary counter means when said detection signal makes a transition from said second state to said first state.

7. A method for synchronizing access to a serial data communication link between a plurality of programmable master devices which each have the capability of initiating a data transaction on said serial data communication link, wherein each one of said programmable master devices has a unique priority address representative of the priority of that programmable master device, wherein each programmable master device has an associated timer, and wherein each one of said programmable master devices is interfaced to said data communication link in such a manner that each one of said programmable master devices can impress a link contention signal on said serial data communication link and can detect said link contention signal on said serial data communication link by determining a first state or a second state of a detection signal, wherein the first state of said detection signal indicates presence of said link contention signal on said serial data comunication link, and the second state of said detection signal indicates absence of said link contention signal on said serial data communication link, said method comprising the following sequential steps which are performed by a first programmable master device which desires to initiate a data transaction:
(a) activating a request-to-send signal to enable a latching circuit associated with said first programmable master device;
(b) waiting for a first timer associated with said first programmable master device to time out, wherein each timer associated with a programmable master device, including said first timer, is set to a time representative of the unique priority address for its associated programmable master device when said detection signal is driven to said first state by the last impressing of said link contention signal on said serial data communication link by a programmable master device, wherein each timer begins counting down when said detection signal makes a transition from said second state to said first state, and wherein said first timer is prevented from timing out if the timer associated with a programmable master device which also desires to initiate a data transaction and which has a higher unique priority address times out before said first timer;
(c) executing a data transaction on said serial data communication link if said first timer times out; and
(d) releasing said request-to-send signal to an inactive state after said data transaction is executed.

8. A method in accordance with claim 7 further comprising the step of impressing a synchronization pulse on said serial data communication link if said link contention signal has not existed on said serial data communication link during an immediate predefined time period, said synchronization pulse comprising a burst of link contention signals which presets the timer associated with each of said plurality of programmable master devices to said unique priority address.

9. A method in accordance with claim 7 wherein said step of executing a data transaction comprises the sequential steps of:

activatng an enable signal to enable an encoder circuit and a line driver circuit associated with said first programmable master device after said first timer has timed out;

transmitting serial data from said first programmable master device on said serial data communication link; and releasing said enable signal activated by said first programmable master device to an inactive state.

* * * * *